United States Patent
Laine et al.

(10) Patent No.: US 11,007,988 B2
(45) Date of Patent: May 18, 2021

(54) CONTROL SYSTEM AND METHOD FOR A VEHICLE COMPRISING AN AUTONOMOUS EMERGENCY BRAKING SYSTEM

(71) Applicant: VOLVO TRUCK CORPORATION, Gothenburg (SE)

(72) Inventors: Leo Laine, Härryda (SE); Fredrik Sandblom, Mölndal (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 175 days.

(21) Appl. No.: 15/772,395

(22) PCT Filed: Nov. 2, 2016

(86) PCT No.: PCT/EP2016/076435
§ 371 (c)(1),
(2) Date: Apr. 30, 2018

(87) PCT Pub. No.: WO2017/076910
PCT Pub. Date: May 11, 2017

(65) Prior Publication Data
US 2018/0319380 A1 Nov. 8, 2018

Related U.S. Application Data

(63) Continuation-in-part of application No. PCT/EP2015/075625, filed on Nov. 3, 2015.

(51) Int. Cl.
*B60T 8/17* (2006.01)
*B60T 7/22* (2006.01)
(Continued)

(52) U.S. Cl.
CPC .............. *B60T 8/1708* (2013.01); *B60T 7/22* (2013.01); *B60T 8/176* (2013.01);
(Continued)

(58) Field of Classification Search
CPC .... B60T 8/1708; B60T 8/176; B60T 8/17558; B60T 7/22; B60W 10/184; B60W 10/20; B60W 30/09; B62D 15/0265
See application file for complete search history.

(56) References Cited

U.S. PATENT DOCUMENTS 5,249,851 A    10/1993   Johnsen
5,479,173 A * 12/1995   Yoshioka .................. B60T 7/22
                                                                        342/70
(Continued)

FOREIGN PATENT DOCUMENTS

CN    101607554 A   12/2009
CN    104245447 A   12/2014
(Continued)

OTHER PUBLICATIONS

International Search Report (dated Jan. 24, 2017) for corresponding International App. PCT/EP2016/076435.
(Continued)

*Primary Examiner* — Behrang Badii
*Assistant Examiner* — Daniel L Greene
(74) *Attorney, Agent, or Firm* — Venable LLP; Jeffri A. Kaminski

(57) ABSTRACT

A control system is provided for a vehicle including an autonomous emergency braking system, characterized in that the control system includes: a brake control arrangement adapted to apply a friction-estimating braking when the autonomous emergency braking system has initiated a possible intervention; a brake force capacity estimation arrangement adapted to estimate the brake force capacity of the vehicle as a function of longitudinal wheel slip based on the applied friction-estimating braking; a road information arrangement adapted to obtain information about road curvature ahead of the vehicle; a lateral tyre force prediction arrangement adapted to predict lateral tyre force needed
(Continued)

during autonomous emergency braking based on the obtained information about road curvature; and a brake strategy adaptation arrangement configured to adapt the brake strategy of the autonomous emergency braking system based on the estimated brake force capacity and the predicted lateral tyre force needed.

14 Claims, 4 Drawing Sheets

(51) Int. Cl.
| | | |
|---|---|---|
| B60T 8/1755 | (2006.01) | |
| B60T 8/176 | (2006.01) | |
| B60W 10/184 | (2012.01) | |
| B60W 10/20 | (2006.01) | |
| B60W 30/09 | (2012.01) | |
| B62D 15/02 | (2006.01) | |

(52) U.S. Cl.
CPC ....... *B60T 8/17558* (2013.01); *B60W 10/184* (2013.01); *B60W 10/20* (2013.01); *B60W 30/09* (2013.01); *B62D 15/0265* (2013.01); B60T 2201/022 (2013.01); B60T 2201/024 (2013.01); B60T 2201/16 (2013.01); B60T 2210/24 (2013.01); B60T 2210/36 (2013.01); B60T 2240/02 (2013.01); B60T 2270/10 (2013.01); B60T 2270/30 (2013.01); B60W 2520/00 (2013.01); B60W 2552/30 (2020.02); B60W 2710/18 (2013.01); B60W 2710/20 (2013.01)

(56) References Cited

U.S. PATENT DOCUMENTS

| | | | | |
|---|---|---|---|---|
| 2003/0173826 | A1* | 9/2003 | Tazoe | B60W 10/18 303/152 |
| 2005/0134440 | A1* | 6/2005 | Breed | G01S 19/50 340/435 |
| 2009/0150034 | A1* | 6/2009 | Ezoe | B60T 7/22 701/53 |
| 2009/0319126 | A1* | 12/2009 | Miyajima | B60K 31/0066 701/41 |
| 2010/0194593 | A1* | 8/2010 | Mays | B60Q 5/006 340/905 |
| 2012/0119894 | A1* | 5/2012 | Pandy | B60W 30/16 340/435 |
| 2013/0173132 | A1 | 7/2013 | Yuasa et al. | |
| 2013/0191000 | A1* | 7/2013 | Hahne | G08G 1/096725 701/70 |
| 2014/0188785 | A1 | 7/2014 | Asai et al. | |
| 2015/0025737 | A1* | 1/2015 | Hermsen | B60T 17/221 701/33.9 |
| 2015/0224845 | A1* | 8/2015 | Anderson | B60G 17/019 701/37 |

FOREIGN PATENT DOCUMENTS

| | | | |
|---|---|---|---|
| CN | 104512412 A | 4/2015 | |
| CN | 104670191 A | 6/2015 | |
| DE | 202012206228 A1 | 10/2013 | |
| EP | 2135769 A1 | 12/2009 | |
| EP | 2853458 A1 | 4/2015 | |
| GB | 2454224 A | 5/2009 | |
| JP | H07132787 A | 5/1995 | |
| JP | 2003191774 A | 7/2003 | |
| JP | 2010003013 A | 1/2010 | |
| WO | WO-2008043850 A1 * | 4/2008 | ............ B60W 40/02 |

OTHER PUBLICATIONS

Chinese Office Action dated Jun. 3, 2020, in corresponding Chinese Application No. 201680064360.5, 8 pages.
Japan Office Action dated Sep. 29, 2020 in corresponding China Application No. 2018-541535, 10 pages.

* cited by examiner

CONTROL SYSTEM AND METHOD FOR A VEHICLE COMPRISING AN AUTONOMOUS EMERGENCY BRAKING SYSTEM

BACKGROUND AND SUMMARY

The invention relates to a control system and method for a vehicle comprising an autonomous emergency braking system. The invention can for example be applied in heavy-duty vehicles, such as trucks, buses and construction equipment.

An autonomous emergency braking (AEB) system, which may also be referred to as an advanced emergency braking system (AEBS), is an autonomous road vehicle safety system that monitors the traffic situation ahead of a vehicle and that automatically apply the vehicle's brakes when certain conditions are fulfilled in order to avoid or mitigate accidents. However, the AEBS assumes that certain conditions apply. For example, the test procedure for AEBS according to Regulation No 131 of the Economic Commission for Europe of the United Nations (UN/ECE) states that the vehicle shall travel in a straight line for at least two seconds prior to the functional part of the test. Also, the AEBS has an emergency braking phase with a deceleration of at least 4 m/s2.

Furthermore, US2013173132 (Yuasa et al.) discloses a braking force control apparatus which controls a braking force applied to a vehicle based on a relation thereof with an obstacle ahead of the vehicle, irrespective of a braking operation of a driver, wherein a lateral force is predicted which can be generated in cases where avoidance steering is carried out by the driver, in order to avoid an obstacle which has been detected, and an actual braking force actually applied to a longitudinal direction of the vehicle is limited in accordance with a braking force which can be applied in the longitudinal direction of the vehicle and which is calculated based on the lateral force thus predicted and on a friction of the vehicle with respect to a road surface on which the vehicle is running.

It is desirable to provide an improved control system and method for a vehicle comprising an autonomous emergency braking system, which control system and method in particular can take "non-ideal" road conditions into account.

According to the first aspect of the invention, there is provided a control system for a vehicle comprising an autonomous emergency braking system, wherein the control system comprises: brake control means adapted to apply a friction-estimating braking when the autonomous emergency braking system has initiated a possible intervention; brake force capacity estimation means adapted to estimate the brake force capacity of the vehicle as a function of longitudinal wheel slip based on the applied friction-estimating braking; road information means adapted to obtain information about road curvature ahead of the vehicle; lateral tyre force prediction means adapted to predict lateral tyre force needed during autonomous emergency braking based on the obtained information about road curvature; and brake strategy adaptation means configured to adapt the brake strategy of the autonomous emergency braking system based on the estimated brake force capacity and the predicted lateral tyre force needed.

The present invention is based on the understanding that applying a "standard" autonomous emergency braking (e.g. the aforementioned ≥4 m/s2 deceleration) when an object is detected in a curve ahead of the vehicle may cause the vehicle to skid off the road (or leave its lane) because the applied braking may severely reduce the lateral tyre force, which lateral tyre force is needed to stay on the road (or in the lane). To this end, by predicting lateral tyre force needed during emergency braking based on information about road curvature ahead of the vehicle, the brake strategy of the autonomous emergency braking system may be adapted so that the vehicle does not skid off the road (or lane) during the emergency braking in the curve. Furthermore, by applying the friction-estimating braking when the autonomous emergency braking system has initiated a possible intervention, the actual road friction at the time and place for this particular intervention may be taken into account. If the friction is relatively low (e.g. because of wet, icy or snowy road conditions) and/or a significant road curvature is identified ahead of the vehicle, the brake strategy may typically be adapted so that the autonomous emergency braking is initiated earlier and with a lower longitudinal brake force than under ideal conditions (dry, straight road). Overall, the present control system may reduce the risk of accidents when autonomous emergency braking is applied under non-ideal conditions. Furthermore, a more accurate distance to stop position can be estimated based on the adapted brake strategy.

The information about road curvature ahead of the vehicle may be obtained from a camera of the vehicle. An advantage of using a camera is that the actual road curvature ahead of the vehicle is detected. Alternatively or complementary, the information about road curvature ahead of the vehicle may be obtained from a navigation system of the vehicle. The navigation system may for example be a built-in GPS. An advantage of using the navigation system is that such a navigation system may already be present in a vehicle, whereby the control system may utilize already existing infrastructure in the vehicle.

The information about road curvature ahead of the vehicle may include a radius r. The lateral tyre force Fy needed may then be predicted using the formula $Fy=(mv \times 2)/r$, where m is the mass of the vehicle and vx is the speed of the vehicle.

The lateral tyre force prediction means may be adapted to predict the lateral tyre force by repeatedly predicting lateral tyre forces towards a desired collision free state of the vehicle relative to an object detected by the autonomous emergency braking system in an ego lane of the road ahead of the vehicle. In this way, the brake strategy may continuously be updated during the intervention, for example to take into account that reduced speed of the vehicle reduces the needed lateral tyre force and/or that the curvature (radius) of the road may change. A reduced radius results in increased lateral tyre force, whereas an increased radius results in decreased lateral tyre force. A 'collision free state' may be construed as stop position of the vehicle relative to a stationary object detected by the autonomous emergency braking system, or a state wherein time to collision (TTC) between the vehicle and a moving object is infinite. An 'ego lane' may be construed as the lane in which the vehicle is travelling.

The friction-estimating braking may be applied only to a certain wheel axle of the vehicle, such as a tag or pusher axle. An advantage of this is that the influence of the friction-estimating braking on the vehicle's normal behaviour and stability may be reduced.

The friction determination means may be adapted to apply the friction-estimating braking directly when, or a predetermined time after, the possible intervention is initiated. An advantage of this is that the friction-estimating braking may function as haptic warning that an autonomous emergency braking system intervention has started. The friction-estimating braking may also be part of a pre-brake phase of the autonomous emergency braking system. Furthermore, since the friction-estimating braking is applied only in conjunction with the autonomous emergency braking system intervention, there is no nuisance fuel consumption increase or brake-disc wear.

The vehicle may be an articulated vehicle comprising a trailer, wherein the brake strategy adaptation means is configured to adapt the brake strategy such that there is enough friction left to maintain trailer stability. The required friction may be calculated as $Fy=(mtrailer vx2)/r$, wherein mtrailer is the mass of the trailer, vx is the speed of the vehicle, and r is the radius of the road curvature.

The control system may further comprise alerting means adapted to alert a driver of the vehicle if the autonomous emergency braking system determines, based on the adapted brake strategy, that the vehicle cannot brake to avoid an object detected by the autonomous emergency braking system. The alert means may for example be adapted to send out a visual and/or acoustic warning that an accident cannot be avoided by braking and that steering is the only option left. Since the control system takes real conditions into account (friction and road curvature), a more accurate warning may be issued.

The control system may further comprise assistance means adapted to assist a driver in a steering manoeuvre to avoid an object detected by the autonomous emergency braking system by automatically brake individual wheels of the vehicle to increase or decrease yaw motion of the vehicle needed to avoid the object if the autonomous emergency braking system determines, based on the adapted brake strategy, that the vehicle cannot brake to avoid the object detected by the autonomous emergency braking system. This may be accomplished by tightening the reference yaw rate band for yaw control of the vehicle, by a feedback control of desired yaw rate with excluded deadband around the reference yaw rate calculated from vehicle speed and steering wheel angle using a simple bicycle model. The braking of the assistance means is then mainly correcting under/over steer, which may increase the chance of successful steering avoidance manoeuvre.

According to a second aspect of the present invention, there is provided a vehicle comprising a control system according to the first aspect.

According to a third aspect of the present invention, there is provided a control method for a vehicle comprising an autonomous emergency braking system, which method comprises the steps of: applying a friction-estimating braking when the autonomous emergency braking system has initiated a possible intervention; estimating the brake force capacity of the vehicle as a function of longitudinal wheel slip based on the applied friction-estimating braking; obtaining information about road curvature ahead of the vehicle; predicting lateral tyre force needed during autonomous emergency braking based on the obtained information about road curvature; and adapting the brake strategy of the autonomous emergency braking system based on the estimated brake force capacity and the predicted lateral tyre force needed. This aspect may exhibit the same or similar features and/or technical effects as the other aspects of the invention.

According to a forth aspect of the present invention, there is provided a computer program comprising program code means for performing the steps of the control method of the third aspect when said program is run on a computer.

According to a fifth aspect of the present invention, there is provided a computer readable medium carrying a computer program comprising program code means for performing the steps of the control method of the third aspect when said program is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
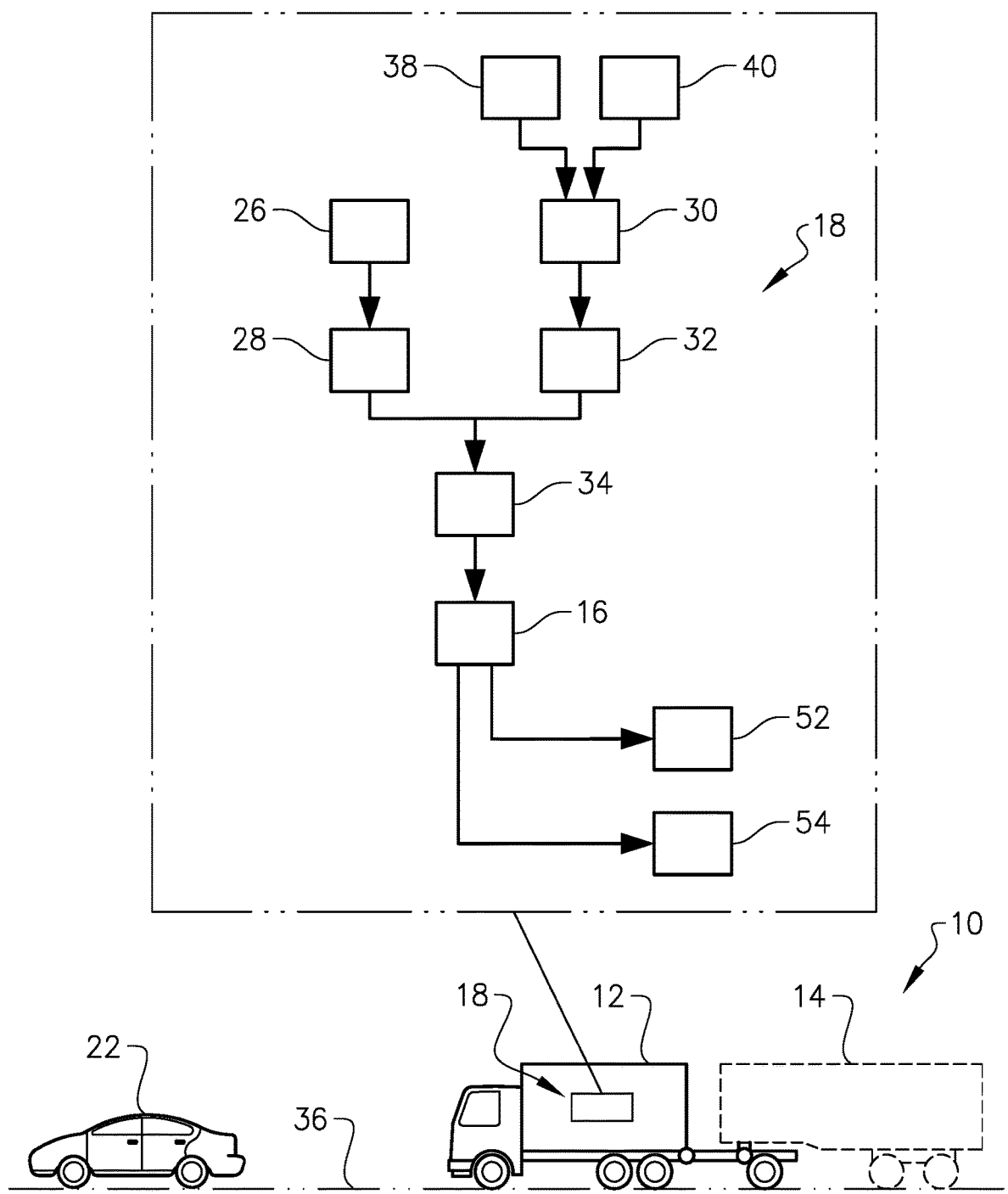
FIG. 1 schematically illustrates a vehicle incorporating aspects of the present invention.

FIG. 1 is a side view of a vehicle 10. The vehicle 10 is a motored road vehicle, such as a (single) truck. Alternatively, the vehicle 10 may be articulated, and comprise a towing vehicle 12 and a trailer 14. The towing vehicle 12 may be a tractor.

The vehicle 10 comprises an autonomous emergency braking system 16, and a control system 18.

Figure 2A:
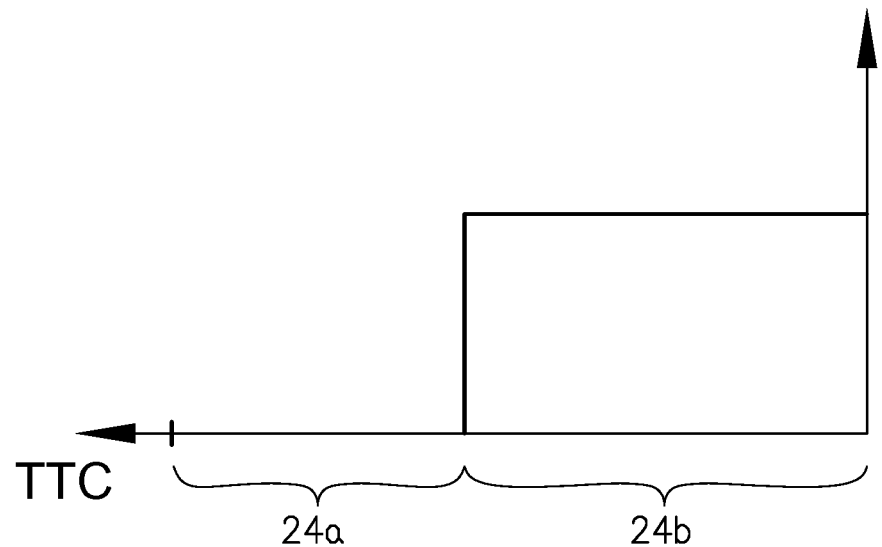
FIG. 2a illustrates phases of an autonomous emergency braking system of the vehicle of FIG. 1.

The autonomous emergency braking system 16 is generally adapted to monitor the traffic situation ahead of the vehicle 10 and to automatically apply the vehicle's brakes when certain conditions are fulfilled in order to avoid colliding with an object 22 in front of the vehicle 10. The object 22 may be stationary or moving. The object 22 may for example be another vehicle. An intervention of the autonomous emergency braking system 16 may have at least two phases: a collision warning phase 24a and an emergency braking phase 24b, see FIG. 2a. In FIG. 2a, the horizontal axis FIG. 2a is time to collision (TTC), and the vertical axis is deceleration. In the collision warning phase 24a, the autonomous emergency braking system 16 may warn the driver of the vehicle 10 of a potential forward collision (i.e. the object 22). In the subsequent emergency braking phase 24b, the autonomous emergency braking system 16 automatically brakes the vehicle 10. The collision warning and emergency braking phases and their timing, duration and/or associated actions may be referred to as the brake strategy of the autonomous emergency braking system 16.

The control system 18 of the vehicle 10 comprises brake control means 26, brake force capacity estimation means 28, road information means 30, lateral tyre force prediction means 32, and brake strategy adaptation means 34. The various means of the control system 18 may be realized by appropriate hardware and/or software.

The brake control means 26 may generally control the brakes of the vehicle 10. In particular, the brake control means 26 is adapted to apply a friction-estimating braking when the autonomous emergency braking system 16 has initiated a possible intervention. The friction-estimating braking may be short. The friction-estimating braking may be applied only to a certain wheel axle of the vehicle 10. Furthermore, the friction-estimating braking may be applied directly when the possible intervention is initiated, e.g. when the collision warning phase 24a begins. Alternatively, the friction-estimating braking may be applied a predetermined short time after the possible intervention is initiated, such as <3 seconds after the collision warning phase 24a begins.

Figure 3:
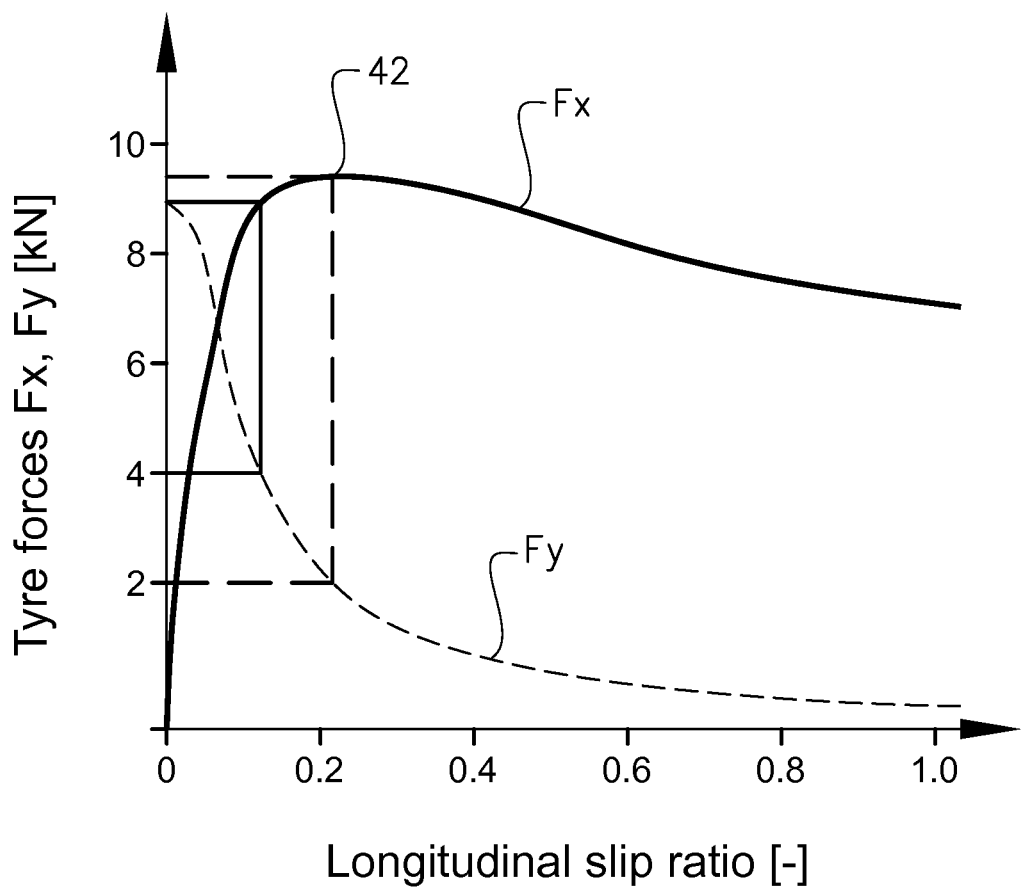
FIG. 3 illustrates tyre forces as function of longitudinal slip.

The brake force capacity estimation means 28 may be connected to the brake control means 26. The brake force capacity estimation means 28 is adapted to estimate the brake force capacity of the vehicle 10 as a function of longitudinal wheel slip based on the friction-estimating braking applied by the brake control means 26. The estimated brake force may be expressed as longitudinal tyre force Fx and lateral tyre force Fy as a function longitudinal slip ratio, as show in FIG. 3. In FIG. 3, the vertical axis is tyre forces Fx, Fy [kN], and the horizontal axis is longitudinal slip ratio. Slip is the relative motion between a tyre and the road surface 36 it is moving on. A longitudinal slip ratio of 0 means that the tyre's rotational speed is equal to the free-rolling speed, whereas a longitudinal slip ratio of 1 means that the tyre is locked and just skids along the road surface 36. Fx as a function of slip may be determined based on:

$$Fx=(BrakePressure*ToWheelTorque-(dwheelspeed/dt)*InertiaWheel)/WheelRadius$$

$$slip=(vx-wheelspeed*WheelRadius)/vx$$

wherein BrakePressure comes from the friction-estimating braking, ToWheelTorque is the brake factor, pressure to gained brake torque [bar/Nm], (dwheelspeed/dt) is the wheel acceleration, InertiaWheel is the rotational inertia of the studied wheel, and WheelRadius is the radius of the studied wheel. BrakePressure may have the unit [bar], ToWheelTorque may have the unit [Nm/bar], (dwheelspeed/dt) may have the unit [rad/s^2], InertiaWheel may have the unit [kgm^2], and WheelRadius may have the unit [m]. BrakePresure may be sampled several times during the friction-estimating braking in order to generate the exemplary Fx curve shown in FIG. 3. Fy may be estimated, as shown in FIG. 3.

The road information means 30 is adapted to obtain information about road curvature ahead of the vehicle. The information may for example include at least one radius r of the road or lane ahead of the vehicle 10, see for example FIG. 4 which will be explained more in the following. The information about road curvature may be obtained from at least one of a camera 38 and a navigation system 40 of the vehicle 10. The navigation system 40 may for example be a built-in GPS.

The lateral tyre force prediction means 32 is connected to the road information means 30. The lateral tyre force prediction means 32 is adapted to predict lateral tyre force Fy needed during autonomous emergency braking based on the information about road curvature obtained by the road information means 30. The lateral tyre force Fy needed may be predicted using the formula Fy=(mvx2)/r, where m is the mass of the vehicle 10 and vx is the speed of the vehicle 10. Analogously, Fy=may, where ay is the lateral acceleration of the vehicle 10. The lateral tyre force Fy needed during autonomous emergency braking may be predicted at least once during the collision warning phase, but it can be also be predicted during the emergency braking phase, so that the brake strategy of the autonomous emergency braking system 16 can be updated.

Figure 2B:
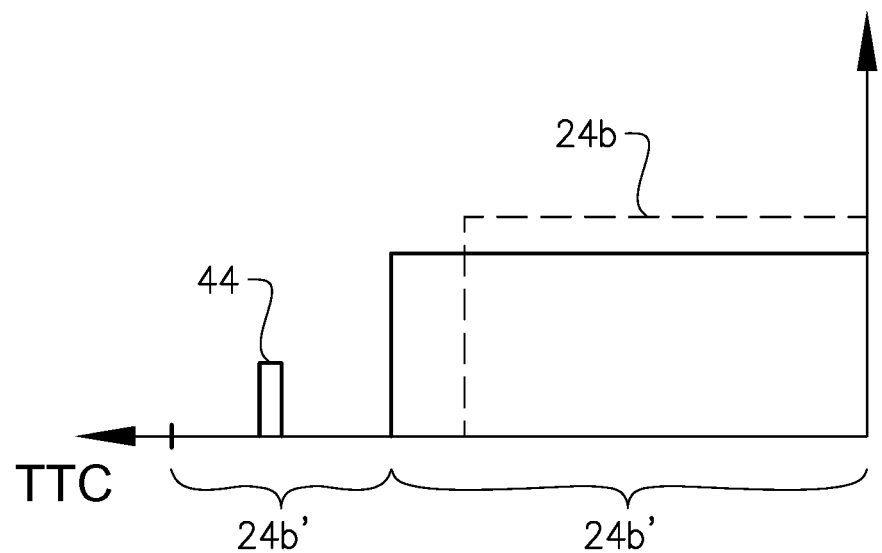
FIG. 2b illustrates adapted phases of the autonomous emergency braking system.

The brake strategy adaptation means 34 is connected to the brake force capacity estimation means 28 and the lateral tyre force prediction means 32. The brake strategy adaptation means 34 is configured to adapt the brake strategy of the autonomous emergency braking system 16 based on the brake force capacity estimated by the brake force capacity estimation means 28 and the needed lateral tyre force Fy predicted by the lateral tyre force prediction means 32. For example, if the lateral tyre force prediction means 32 predicts that a lateral tyre force Fy of 4 kN is needed at the current speed vx in order for the vehicle 10 to cope with a road curvature r, the corresponding longitudinal tyre force Fx is about 9 kN, see FIG. 3. Fx=9 kN is below the optimal braking point 42, but at the optimal braking point 42 the corresponding lateral tyre force is simply too low (about 2 kN). The brake strategy adaptation means 34 therefore adapts the brake strategy of the autonomous emergency braking system 16 so that the autonomous emergency braking is initiated earlier and with a lower deceleration (=lower longitudinal brake force). This is illustrated in FIG. 2b, wherein the collision warning phase 24a' is shorter, and the emergency braking phase 24b' is longer, starts earlier and has a lower longitudinal brake force. FIG. 2b also illustrates the aforementioned friction-estimating braking 44 in the collision warning phase 24a'.

Figure 4:
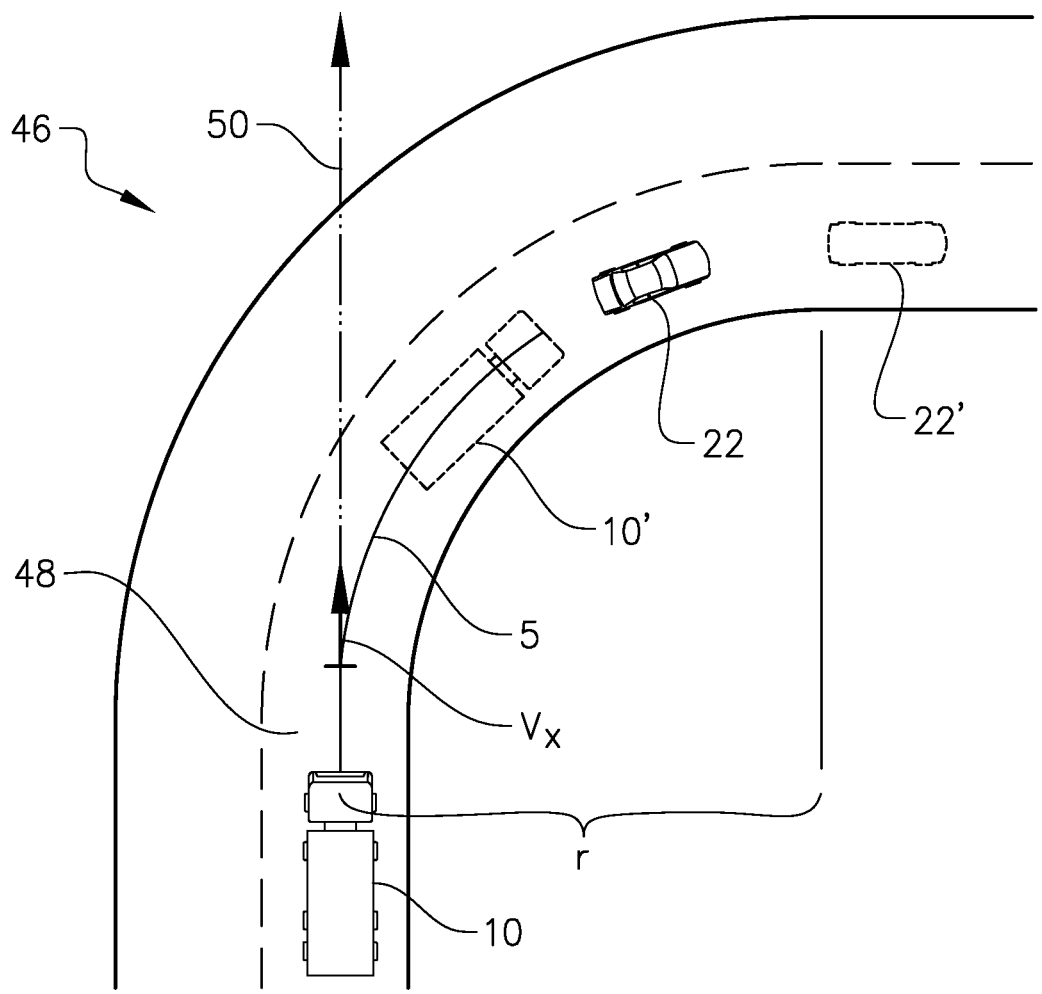
FIG. 4 is a top view of the vehicle of FIG. 1 entering a curve.
Figure 5:
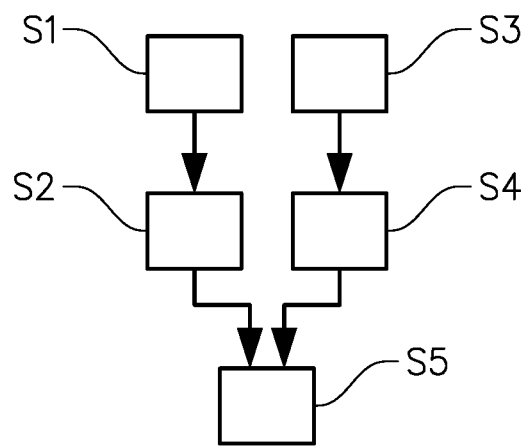
FIG. 5 is a flow chart of a control method according to an embodiment of the present invention.

A control method corresponding to the control system 16 will now be described with further reference to FIGS. 4-5. FIG. 4 shows the vehicle 10 entering a curve 46. The curve has a radius r. The vehicle 10 is positioned in its ego lane 48. The vehicle 10 has a mass m and a speed vx. The autonomous emergency braking system 16 of the vehicle 10 detects an object 22 in the curve 46 ahead of the vehicle 10, and a possible intervention is initiated. Just applying the autonomous emergency braking without first adapting the braking strategy could cause the vehicle 10 to exit its lane 48 and even skid off the road, as illustrated by arrow 50, in particular if the road is slippery and/or if the curve 46 is tight (small radius r).

However, in accordance with the control method, when the autonomous emergency braking system 16 has initiated the possible intervention, a friction-estimating braking is applied (S1). Based on the applied friction-estimating braking, the brake force capacity of the vehicle 10 is estimated as a function of longitudinal wheel slip (S2). Furthermore, information about road curvature ahead of the vehicle, for example the radius r, is obtained (S3). Based on the obtained information about road curvature, lateral tyre force needed during autonomous emergency braking is predicted (S4). Then, the brake strategy of the autonomous emergency braking system 16 is adapted (S5) based on the estimated brake force capacity and the predicted lateral tyre force needed.

Then, the autonomous emergency braking system 16 may automatically brake the vehicle 10 in accordance with the adapted braking strategy in order to avoid colliding with an object 22. If the friction-estimating braking reveals that the friction against the road surface 36 is relatively low (e.g. because of wet, icy or snowy road conditions) and/or the curve 46 is tight, the brake strategy may typically be adapted so that the autonomous emergency braking (i.e. the emergency braking phase) is initiated earlier and with a lower longitudinal brake force than under ideal conditions (dry, straight road). In this way, the vehicle 10 can stay in its lane 48 during the emergency braking. Reference sign 10' in FIG. 4 designates a stop position of the vehicle in case the object 22 is stationary (s is the required braking distance). Alternatively 10' illustrates a state wherein the vehicle has slowed down so much that it travels with the same or lower speed than moving object 22' (TTC is infinite).

In case the vehicle 10 is articulated, the brake strategy adaptation means 34 may be configured to adapt the brake strategy such that there is enough friction left to maintain trailer stability. The required friction may be calculated as Fy=(mtrailer·vx2)/r, wherein mtrailer is the mass of the trailer, vx is the speed of the vehicle 10, and r is the radius of the road.

Furthermore, if the autonomous emergency braking system 16 determines, based on the adapted brake strategy, that the vehicle 10 cannot brake to avoid the object 22 (for example the braking distance s may be too long or the TTC may be shorter than the emergency brake phase 24b'), the driver of the vehicle 10 may be alerted accordingly. To this end, the control system 18 may further comprise alerting means 52 (FIG. 1). The alerting means may for example be adapted to send out a visual and/or acoustic warning that an accident cannot be avoided by braking and that steering is the only option left. The control system 18 may further comprise assistance means 54 adapted to assist the driver in the steering manoeuvre by automatically braking individual wheels of the vehicle 10 to improve (e.g. increase or decrease) yaw motion of the vehicle 10 needed to avoid the object 22. This may for example be accomplished by reducing the reference yaw rate band (e.g. excluding the deadband) for yaw control of the vehicle 10.

It is to be understood that the present invention is not limited to the embodiments described above and illustrated in the drawings; rather, the skilled person will recognize that many changes and modifications may be made within the scope of the appended claims.

The invention claimed is:

1. A control system for a vehicle comprising an autonomous emergency braking system, wherein the autonomous emergency braking system is adapted to monitor the traffic situation ahead of the vehicle and to automatically apply the vehicle's brakes when certain conditions are fulfilled in order to avoid colliding with an object in front of the vehicle, comprising: brake control means adapted to apply a friction-estimating braking when the autonomous emergency braking system has initiated a possible intervention, wherein the friction-estimating braking is part of a pre-brake phase of the autonomous emergency braking system; brake force capacity estimation means adapted to estimate the brake force capacity of the vehicle as a function of longitudinal wheel slip based on the applied friction-estimating braking; road information means adapted to obtain information about road curvature ahead of the vehicle; lateral tire force prediction means adapted to predict lateral tire force needed during autonomous emergency braking based on the obtained information about road curvature; and brake strategy adaptation means configured to adapt the brake strategy of the autonomous emergency braking system based on the estimated brake force capacity and the predicted lateral tire force needed.

2. A control system according to claim 1, wherein the information about road curvature ahead of the vehicle is obtained from a camera of the vehicle.

3. A control system according to claim 1, wherein the information about road curvature ahead of the vehicle is obtained from a navigation system of the vehicle.

4. A control system according to claim 1, wherein the information about road curvature ahead of the vehicle includes a radius (r).

5. A control system according to claim 1, wherein the lateral tire force prediction means is adapted to predict the lateral tire force by repeatedly predicting lateral tire forces towards a desired collision free state of the vehicle relative to an object detected by the autonomous emergency braking system in an ego lane of the road ahead of the vehicle.

6. A control system according to claim 1, wherein the brake control means is adapted to apply the friction-estimating braking only to a certain wheel axle of the vehicle.

7. A control system according to claim 1, wherein the brake control means is adapted to apply the friction-estimating braking directly when, or a predetermined time after, the possible intervention is initiated.

8. A control system according to claim 1, wherein the vehicle is an articulated vehicle comprising a trailer, and wherein the brake strategy adaptation means is configured to adapt the brake strategy such that there is enough friction left to maintain trailer stability.

9. A control system according to claim 1, further comprising alerting means adapted to alert a driver of the vehicle if the autonomous emergency braking system determines, based on the adapted brake strategy, that the vehicle cannot brake to avoid an object detected by the autonomous emergency braking system.

10. A control system according to claim 1, further comprising assistance means adapted to assist a driver in a steering manoeuvre to avoid an object detected by the autonomous emergency braking system by automatically brake individual wheels of the vehicle to increase or decrease yaw motion of the vehicle needed to avoid the object if the autonomous emergency braking system determines, based on the adapted brake strategy, that the vehicle cannot brake to avoid the object detected by the autonomous emergency braking system.

11. A vehicle comprising a control system according to claim 1.

12. A control method for a vehicle comprising an autonomous emergency braking system, wherein the autonomous emergency braking system is adapted to monitor the traffic situation ahead of the vehicle and to automatically apply the vehicle's brakes when certain conditions are fulfilled in order to avoid colliding with an object in front of the vehicle, comprising: applying a friction-estimating braking when the autonomous emergency braking system has initiated a possible intervention, wherein the friction-estimating braking is part of a pre-brake phase of the autonomous emergency braking system; estimating the brake force capacity of the vehicle as a function of longitudinal wheel slip based on the applied friction-estimating braking; obtaining information about road curvature ahead of the vehicle; predicting lateral tire force needed during autonomous emergency braking based on the obtained information about road curvature; and adapting the brake strategy of the autonomous emergency braking system based on the estimated brake force capacity and the predicted lateral tire force needed.

13. A computer comprising a computer program for performing the steps of claim 12 when the program is run on the computer.

14. A non-transitory computer readable medium comprising a computer program for performing the steps of claim 12 when the program is run on a computer.

* * * * *